July 6, 1937.   H. S. VAN DOREN   2,085,881

REMOTELY CONTROLLED CHEMICAL COMPOUND FORMULATOR

Filed March 3, 1936   3 Sheets-Sheet 1

INVENTOR.
HAROLD S. VAN DOREN
BY
ATTORNEY.

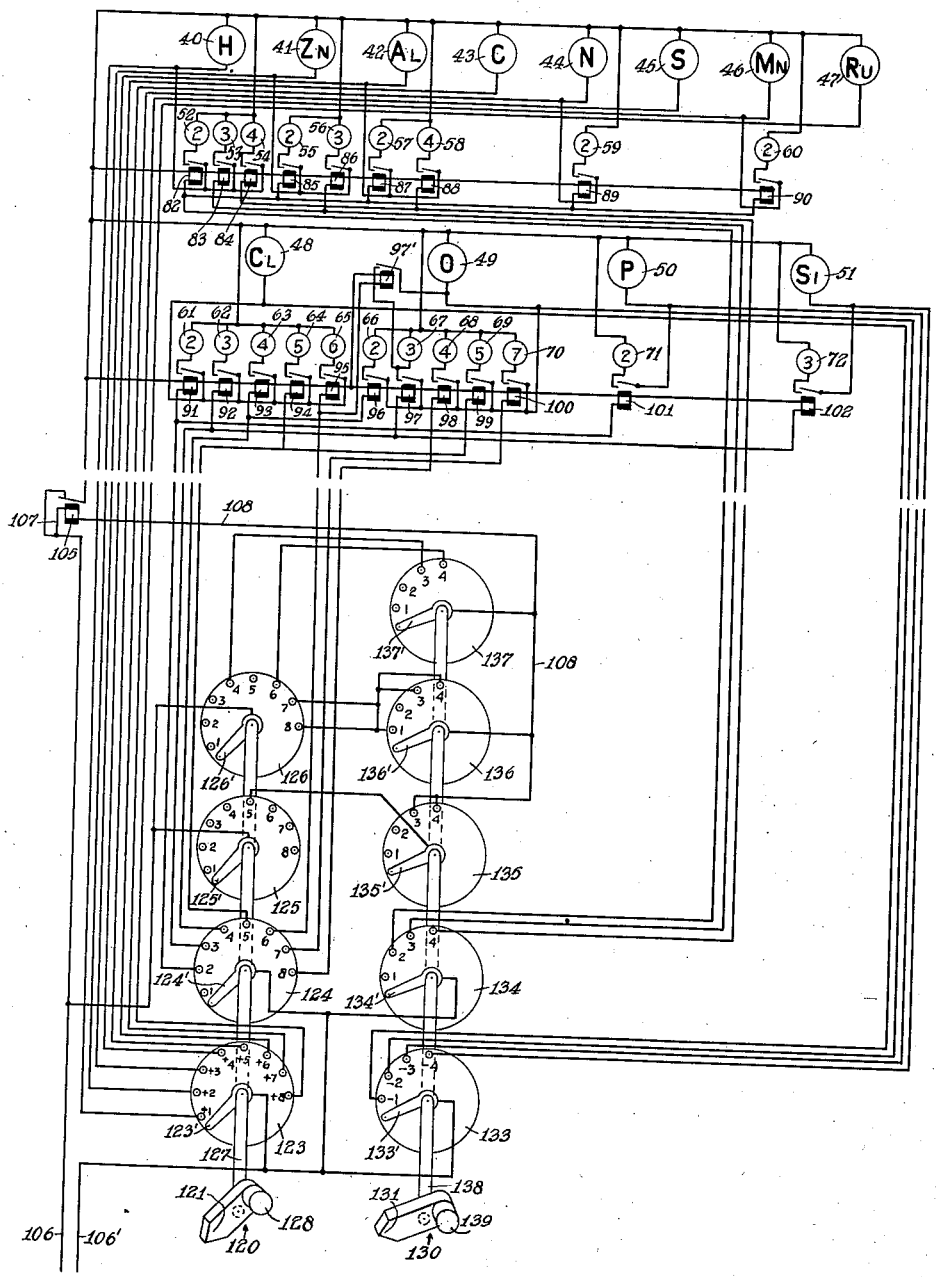

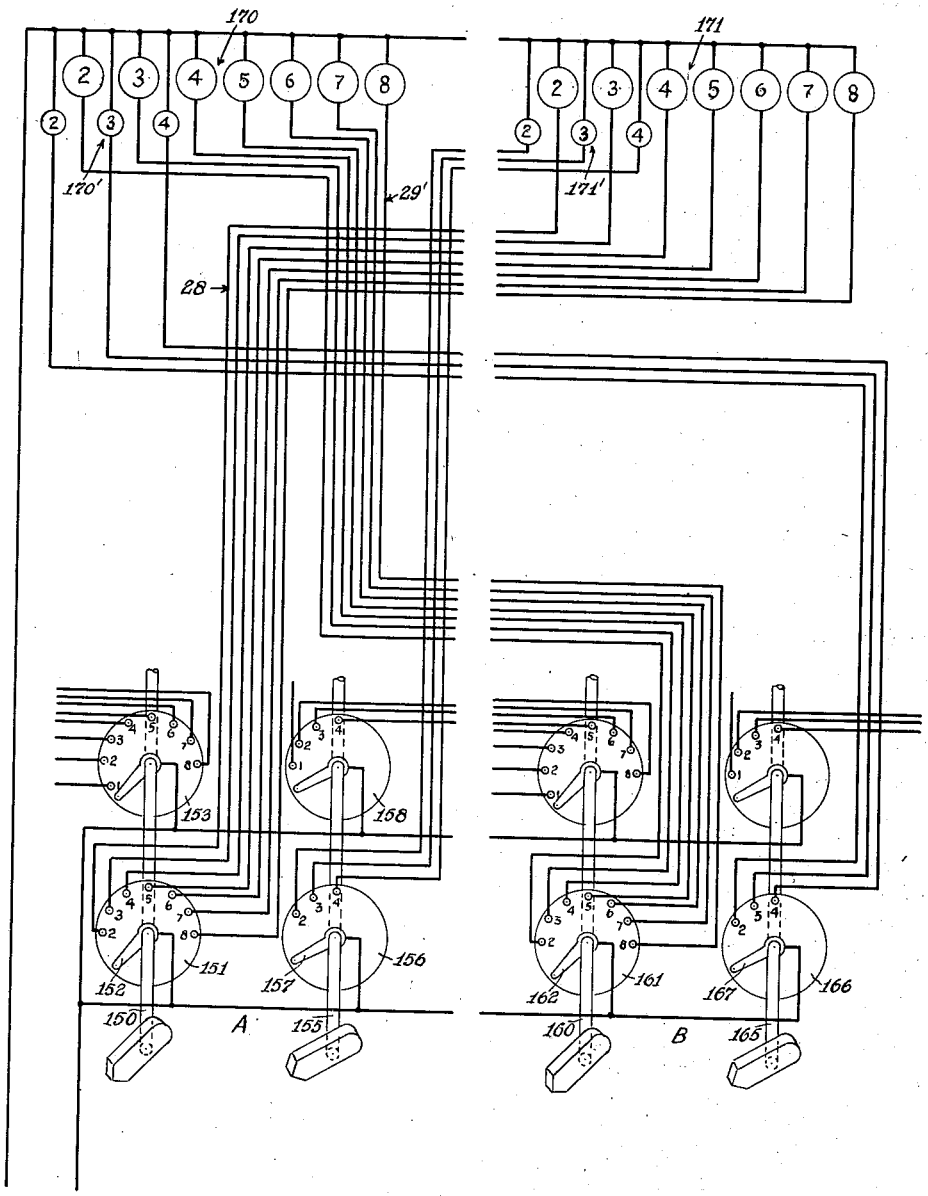

Patented July 6, 1937

2,085,881

UNITED STATES PATENT OFFICE 2,085,881

REMOTELY CONTROLLED CHEMICAL COMPOUND FORMULATOR

Harold S. van Doren, Williston Park, N. Y.

Application March 3, 1936, Serial No. 66,795

10 Claims. (Cl. 35—18)

The invention relates to educational apparatus, more especially as adapted to chemical problems such as the determination of proper combining values in the chemical union of different elements or radicals.

It has for an object the provision of apparatus embodying a remote control element and a display element operable therefrom and on which latter are provided illuminable panels arranged in a group of symbols of the elements and radicals of positive characteristics and a group of panels bearing symbols of elements or radicals of negative characteristics, together with associated numerals indicating the different combining values or atomic ratios under which an element or radical of one group may enter into combination with an element or radical of the other group.

Another object of the invention resides in the provision of means for effecting illumination of the particular elements or radicals selected, together with the corresponding ratio numbers; and in the event of an incorrect setting, as in the selection of elements from a pair of groups which cannot chemically combine, the provision of means for extinguishment automatically of all illumination.

A still further object of the invention resides in the addition to the foregoing apparatus of means whereby elements or radicals, correctly combined through proper selection in one apparatus, may, as a compound or element, be combined with a compound or element similarly resulting from the operation of a like apparatus also provided with illumination means, together with the illumination of additional numbers corresponding to the number of units of two compounds or an element and a compound reacting.

In carrying out the invention, two sets of rotary gang switches are arranged for manual control, each switch embodying a plurality of angularly disposed switch elements with steps so arranged that like angular displacements register corresponding contact positions (active or blank) in each of the switch elements. One gang switch is arranged for the illumination of a series of signal blocks or panels having symbols representing positive group elements and/or radicals; and another switch is associated therewith to illuminate panels having symbols representative of negative elements and/or radicals. The circuits controlled by the two switches, moreover, are so interconnected that when elements are selected which may chemically combine with each other, not only will the selected element of each group be illuminated, but there will be displayed with each element an illuminated number setting forth the particular atomic ratio thereof under which the combination is effected. In the event that elements have been selected which cannot chemically combine with each other, or are of improbable combinations, further switch elements serve to control a relay for interrupting the current supply to the respective illumination means so that no illumination whatsoever will be had when the setting is incorrectly completed and thus indicating that incorrect selection has been made.

By combining two sets of the apparatus as in the provision of an additional switch element to each gang switch of an apparatus, suitable interconnection may be had between said two apparatuses for representing by corresponding illumination the number of combining units of the one selected compound or element entering into combination with the compound or element selected on the other apparatus and the number of combining units thereof.

The nature of the invention, however, will best be understood when described in connection with the accompanying drawings, in which:

Fig. 2 is a diagrammatic view showing the novel arrangement of switches, lamps, and relays, and the electrical connections thereto.

Fig. 3 is a similar, but fragmentary view, illustrating a modification.

Figure 1:
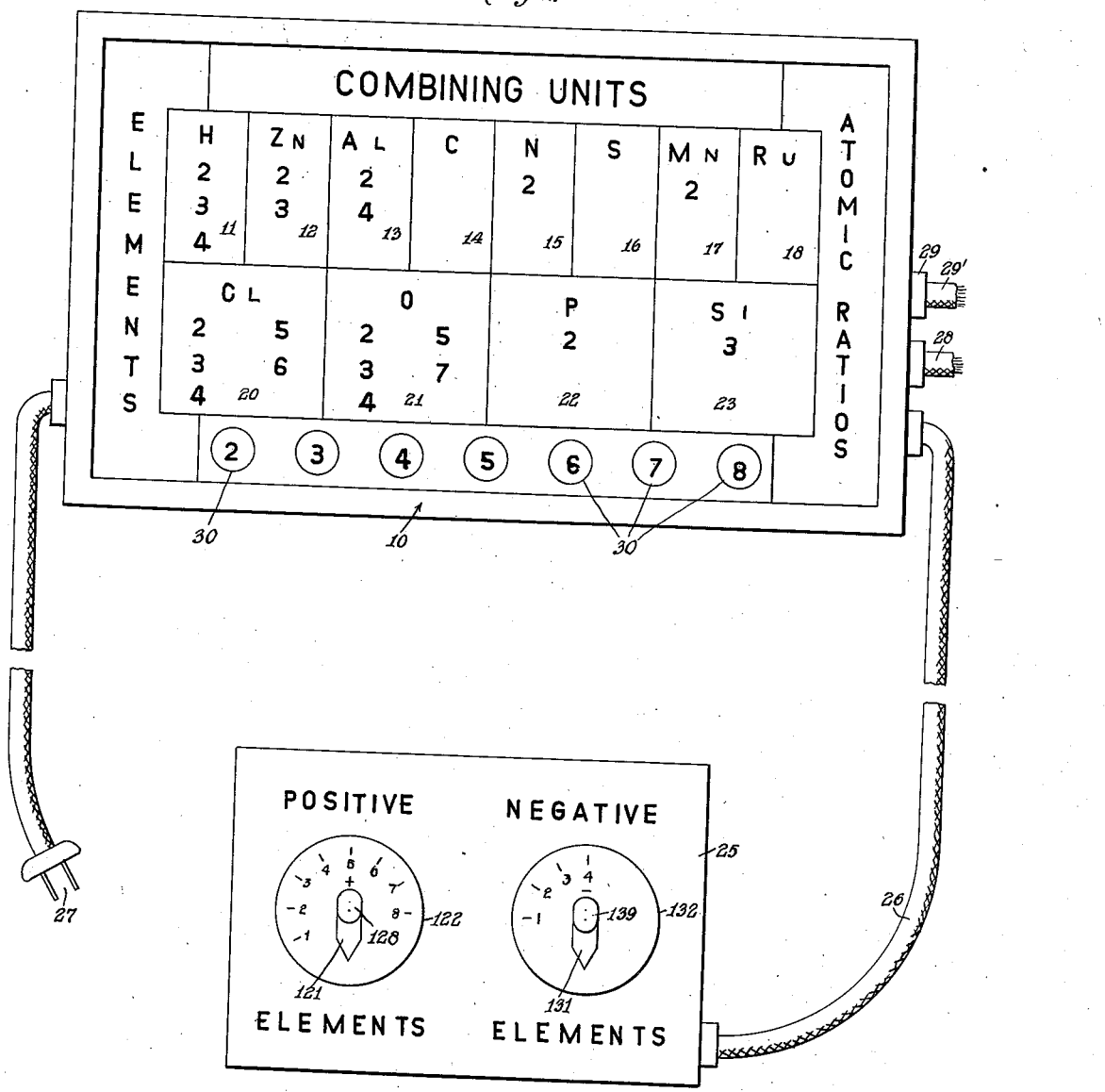
Fig. 1 shows in elevation the panel member and remote control member therefor constituting the novel apparatus.

Referring to the drawings, 10 designates a panel member or board having associated therewith a plurality of lamps, more particularly indicated in Fig. 2 of the drawings, and hereinafter more fully described. These lamps are designed to illuminate under certain controlled conditions individual suitable indicia of panel elements located over the face of the panel member 10. For example, a block of the panel members 11, 12, 13, 14, 15, 16, 17, and 18 may be representative of different positive chemical elements or radicals, as indicated by the chemical symbols thereof, one of which only is shown in each instance on the respective panel elements. With each of the said panel elements are associated also the atomic ratio numbers of the particular chemical element or radical represented on a panel element.

A second associated block of these panel elements is indicated at 20, 21, 22, and 23, the same being representative of negative chemical elements or radicals; and each panel element of this second block bears the appropriate chemical symbol together with the atomic ratio number or numbers of the chemical element or radical designated by such symbol or symbols.

It is preferred to operate the apparatus from some remote point; and to this end, a control panel 25 is provided and is connected to the panel member 10 by means of a cable 26. Power for operating the various lamps, to afford indication in accordance with the selections made at the remote control panel, many be had through the plug connector 27 designed to fit a suitable socket (not shown) of a source of electricity.

Where the apparatus aforesaid is designed to be combined with a similar apparatus, for setting up combinations of the compounds selected on each of the respective panel members, an outlet cable 28 is provided from the one panel member and a socket 29 also provided thereon to receive a cable 29' from the other. In addition, the panel member 10 is then provided with a further block of lamps for illuminating a series of numbers 30 representative of the number of units of the particular compound selected and entering into combination with the corresponding compound selected on the associated panel member. The arrangement for effecting such combination is more especially set forth in Fig. 3 of the drawings, and will hereinafter be more fully described.

The particular circuits and manner of control of the lights for the different blocks of lamps of a panel representative of the chemical element and of the lamps for illumination of the numbers designating the combining number or numbers of a particular element, is more particularly set forth in Fig. 2 of the drawings. Reference being had to this figure, the block of lamps for the positive chemical elements shown on the panel elements 11—18, is indicated at 40, 41, 42, 43, 44, 45, 46, and 47; and the particular block of lamps for the negative chemical elements shown on the panels 20—23, is indicated at 48, 49, 50, and 51.

The ratio lamps for the elements indicated by lamp 40 are shown at 52, 53, and 54, this particular element combining with three different ratios additional to unity. The elements represented by the lamps 41 and 42 combine with two additional different ratios only and are indicated respectively at the lamps 55, 56 and 57, 58. Where the combining ratio is unity, as is the case with the elements represented by the lamps 43, 45, and 47, no ratio lamps are required. The elements represented at the lamps 44 and 46 combine with ratios of two, and therefore but a single lamp, indicated at 59 and 60, is provided in each case.

Similarly, in connection with the block of lamps for the negative chemical elements, the element indicated at the lamp 48 requires five ratio lamps which are indicated at 61, 62, 63, 64, and 65. This is the case also with the element indicated by the lamp 49. There is thus provided for the latter the five lamps indicated at 66, 67, 68, 69, and 70. In the case of the two elements indicated at the lamps 50 and 51, the ratio value is two, so that but a single lamp in each case is provided, being indicated at 71 and 72, respectively.

Furthermore, the ratio lamps for each block are provided with individual normally open relay members which control the illumination of the respective ratio lamps. Thus, lamps 52, 53, and 54 are provided with the relays 82, 83, and 84; the lamps 55 and 56, with the relays 85 and 86; the lamps 57 and 58, with the relays 87 and 88; and the lamps 59 and 60, respectively with the relays 89 and 90—all of the positive element block.

In the case of the negative element block, the lamps 61, 62, 63, 64, and 65 are provided respectively with the relays 91, 92, 93, 94, and 95; the lamps 66, 67, 68, 69, and 70, with the relays 96, 97, 98, 99, and 100; and the lamps 71 and 72, respectively, with the relays 101 and 102. In the case of the lamp 67 controlled primarily by relay 97, this lamp is bridged by a further energizing relay 97' controlled by energization of relay 95 of lamp 65. This is for the purpose of taking care of the ratio necessary in a combination such as $SO_3$ or any other element of (+6) valence used in combination with an element or radical of (—2) valence.

A further and cutout relay 105 is provided and normally closes one side 106 of the feed circuit to the element indicating lamps 40—47, inclusive, of the positive elements; and 48—51, inclusive, of the negative elements, as well as to their ratio lamps. The other lead 106' of this feed circuit goes to the primary control arms of respective switches hereinafter more fully described. Relay 105 is controlled through a circuit embodying the lead 107, and the lead 108 also connected to said respective switches.

The said switches are in the nature of gang switches and are designated as 120 and 130, respectively, the former being provided with an indicator 121 and the latter with an indicator 131. These indicators, in the panel member illustrated in Fig. 1, are designed to travel respectively over dials 122 and 132 suitably graduated to conform to the positive elements in the case of the former dial, and to the negative element in the case of the latter dial, and with uniform and corresponding angular graduations.

The gang switch 120 bears a series of angularly movable contact members or switch elements 123, 124, 125, and 126, all being mounted on a common shaft 127 so as to have like angular movement upon rotation, effected manually, as by means of a knob or the like 128. Similarly, the gang switch 130 comprises a plurality of angularly movable contact members or switch elements 133, 134, 135, 136, and 137, all being mounted on a common shaft 138 so as to have like angular movement upon rotation, as by means of a knob or the like 139.

A contact arm 123' is designed to move over a series of eight equally spaced active contacts of the member 123; a contact arm 124', over a series of seven active contacts of contact member 124; contact arm 125', over but a single contact of contact member 125, while a contact arm 126' moves over a series of four contacts of member 126. In the case of the gang switch 130, the first contact member is provided with an arm 133' designed to move over a series of four equally spaced contacts; contact arm 134' of member 134 is designed to move over a series of three equally spaced contacts of this member; contact arm 135' of member 135 is designed to move over two contacts of this member; the arm 136', to move over three contacts of member 136; and contact arm 137', to move over two contacts of member 137.

The contact arms of all of the contact members of each of the respective switches are similarly positioned angularly and each moves a like angular amount upon rotation of its respective shaft 127 or 138. In the case of the contact members 123 and 133, their respective contact arms are connected to the lead 106'; and the spaced contacts on the respective contact members are connected, in the case of the member 123, successively to the lamps 40—47, inclusive; and in the case of the member 133, are connected successively to the lamps 48—51, inclusive. Thus, upon contacting any particular contact of either of these switch contact members 123, 133, the circuit is completed to a corresponding lamp to energize the same—all the lamps being connected directly to the other lead 106 of the supply main.

Furthermore, the angular displacement necessary to effect such illumination will effect a corresponding angular positioning of the remaining contact arms of each of the switch members. Thus, in the case of switch 120, contact arm 124', which is connected, together with the switch arm 134', to the power lead 106, may be positioned to energize one or more of the relays controlling the ratio lamps for the block of negative elements. Similarly, operation of switch 130 will cause contact arm 134' to assume a position which may close the circuit to one or more of the relays for the ratio lamps of the block of positive elements.

The remaining contact members of both of these switches serve to control the cutout relay 105 for the common power lead 106 for all of the lamps so that, if an incorrect selection be made, the relay 105 will operate to open this lead. The return lead 108 to the power circuit for operating relay 105 is, to this end, adapted to be connected to all of the arms of the said remaining contact members; that is to say, directly to the arms 136' and 137' of switch 130, and indirectly to the arms 125' and 126' of switch 120. Suitable interconnection of these arms through the contacts of the different contact members will be effected under certain conditions to complete the circuit through the lead 108 to the said relay 105.

By the addition of a further contact member to the respective shafts of each of the two gang switches, it becomes possible to interconnect two of the apparatuses to set forth, as by the illumination of a corresponding number, the number of combining units of the compound or element set up on one of the apparatuses entering into combination with the compound set up on the other, the number of units of the latter also being indicated. Thus, reference being had to Fig. 3 of the drawings, there is provided on the shaft 150 of the apparatus "A" contact member 151 with contact arm 152, the contact member 151 being additional to the contact member 153 corresponding to contact member 123 of the mechanism illustrated in Fig. 2—the remaining contact members for sake of simplicity being omitted. Similarly, shaft 155 is provided with a contact member 156 and contact arm 157, this contact member being additional to contact member 158 corresponding to contact member 133 of the mechanism illustrated in Fig. 2—the remaining contact members for sake of simplicity being omitted. Contact member 151 is provided with seven active contact positions, while the contact member 156 is provided with only three.

A similar arrangement is provided in case of the apparatus "B", the one shaft 160 being provided with contact member 161 having an arm 162, while the shaft 165 is provided with the contact member 166 having a contact arm 167. The contact member 161 is similarly provided with seven active positions, and the contact member 166 with three active positions.

Moreover, each apparatus is provided with an additional series of lamps 170 and 171 and seven in number. These lamps are designed to display numbers from 2 to 8 in each series to represent the number of combining units, no designation being provided where but a single combining unit is involved. The lamps of one series are designed to be energized from the opposite apparatus, that is to say, from the contact member thereof. For example, contact member 151 of apparatus "A" will have its successive contact positions connected to the lamps 171 through cable 28; and the contact member 161 will have its successive contact positions connected to the lamps 170 through a cable 29'. The relative angular positions of the contact arms 152 and 157, with respect to the corresponding positions of the contact members 153 and 158, are such that the former contact members do not become effective until after the first position of the contact members 153 and 158 has been attained.

For the contact member 156 additional lamps 171' are provided and are juxtaposed to the first three lamps of the bank 171 corresponding to the 2, 3, and 4 combining unit numbers thereof; and, similarly, for the contact member 166 additional lamps 170' are provided and are juxtaposed to the first three lamps of the bank 170 corresponding to the 2, 3, and 4 combining unit numbers thereof. The conductors for both of these circuits are included also in the aforesaid cables 28 and 29'.

In operation, the apparatus is manipulated as follows, reference being had to Figs. 1 and 2 of the drawings. Assuming that the positive element hydrogen of valence "1" is selected to be combined with the negative element chlorine, the indicator 121 will be set to the position designated "1" by appropriately turning knob 128. This will operate gang switch 120 to supply current to illuminate lamp 40; but as hydrogen is monovalent in this combination, no ratio lamp will be illuminated. The gang switch 130 is similarly manipulated to bring arm 133' into the position corresponding to the designation "1" on the dial 132 for chlorine, by turning knob 139 until it is indicated. This will effect illumination of lamp 48; but none of the ratio lamps 61—64 will be energized. The control of these lamps in both instances is through their respective relays 82, 83, and 84 and 91—95, inclusive. The former relays are controlled from the contact member 134 but as the angular position of this arm 134' is insufficient to reach an active position of said arm, none of the relays 82, 83 or 84 will be energized. This applies also to the position of arm 124' of contact member 124 so that none of the relays 91—95 inclusive will be energized. The positions of the arms 125' and 126' of switch 120 as well as of the arms 135', 136' and 137' is such that no circuit will be completed through relay 105 and no opening of the supply circuit is caused—the setting having been for a correct combination and selection of valences. It is to be observed that though the arm 136' of switch 130 may have attained an active position, the circuit fails to be completed at contact member 126.

As an example of the combination of multivalent elements, zinc and phosphorous may be selected. As in the previous example, pointer 121 will be turned to the designation "2" on dial 122—zinc being divalent in this compound. Thereby the contact arm 123' is brought to the second position on the contact member 123; this will supply current for illuminating lamp 41. Similarly, the indicator 131 is set to the designation "3" on dial 132—phosphorous being trivalent in the combination. This corresponds to the third position on contact member 133, and secures thereby the illumination of lamp 50. The third position of arm 134', however, serves to actuate the relay 86 for energization of lamp 56 setting forth that zinc is taken three times as a unit in this combination. The second position on contact member 123 brings arm 124' of contact member 124 to the first active position and causes actuation of relay 101 and energization of its controlled lamp 71. This indicates that element phosphorous in this combination is taken twice as a unit—the illumination effected by the setting of switches 120 and 130 as aforesaid then appearing as "Zn₃" and "P₂".

This is also a correct combination; and relay 105 will not be actuated for neither of the contact arms 125' and 126' of switch 120 has attained an active position; and while arms 135', 136', and 137' of switch 130 may have attained active positions, the circuit in each instance is interrupted at the corresponding contact members 125 and 126.

When an incorrect, rare or improbable combination is set up, for example, as in the case of heptavalent manganese and monovalent chlorine, arm 123' of switch 120 would attain its seventh position and for the time being would illuminate lamp 46. Similarly, arm 133' of switch 130 would be set to its first position; but in the previous setting arm 126' has reached a position where it connects directly with the first position of arm 136'; and as this arm, through the setting of switch 130, has also attained its first position, the circuit is completed through the relay 105, opening the one side or lead 106 of all of the lamp circuits. This lack of illumination would indicate that an impossible, rare or improbable combination of elements has been set up.

In combining two of these apparatuses, as indicated in Fig. 3, the compound on each is first made up as hereinbefore described; and, if correctly selected, the lamps with proper designations as to elements and ratio numbers will be illuminated. At the same time, the number of units of such compound will be indicated at the lamps 170—170' and 171—171', except in the case of single units of a compound for which no provision is made as to illumination. For example, if the compound Fe₂O₃ were indicated on one apparatus, the particular lamps of the group 170—170', displaying the designations "3" and "2", would be illuminated; and combining this with H₃PO₄, the particular lamp of the group 171—171' having the designation "3" would be energized. This is due to the fact that no matter how many "H" atoms are selected for combination, the valence of hydrogen is still unity, but the PO₄ radical has a valence of 3 and thus effects illumination of a "3" lamp. This indicates that 1 part of the former (Fe₂O₃) will combine with 2 parts of the latter (H₃PO₄), reduced to its simplest proportions.

If desired, additional contact members (not shown) may be associated with the different gang switches whereby to transfer to corresponding further panels (not shown) and indicate thereon reaction products resulting from combining the two compounds thus set up, and to set forth in connection therewith the number of reaction units of each. It will be understood, also, that the panel arrangement may be multiplied to accommodate reacting compounds of a type different from those herein indicated.

I claim:

1. Educational apparatus embodying a block of electric lamps, each lamp being associated with indicia representative of a different positive chemical element or radical; a second block of electric lamps, each lamp being associated with indicia representative of a different negative chemical element or radical; a gang switch for selecting a predetermined lamp of the first block; a gang switch for selecting a predetermined lamp of the second block; and interconnecting circuits for the said switches and lamps, and a source of electricity for energizing the respective selected lamps.

2. Educational apparatus embodying a block of electric lamps, each lamp being associated with indicia representative of a different positive chemical element or radical; a second block of electric lamps, each lamp being associated with indicia representative of a different negative chemical element or radical; a gang switch for selecting a predetermined lamp of the first block; a gang switch for selecting a predetermined lamp of the second block; interconnecting circuits for the said switches and lamps, and a source of electricity for energizing the respective selected lamps; and means for interrupting automatically the supply of electricity to the selected lamps under certain combinations thereof as selected by said gang switches.

3. Educational apparatus embodying a block of electric lamps, each lamp being associated with indicia representative of a different positive chemical element or radical; a second block of electric lamps, each lamp being associated with indicia representative of a different negative chemical element or radical; a gang switch for selecting a predetermined lamp of the first block; a gang switch for selecting a predetermined lamp of the second block; interconnecting circuits for the said switches and lamps, and a source of electricity for energizing the respective selected lamps; and relay means operated by both of the gang switches for interrupting the supply of electricity to the selected lamps under certain combinations thereof as selected by said gang switches.

4. Educational apparatus embodying a block of electric lamps, each lamp being associated with indicia representative of a different positive chemical element or radical, and an additional lamp or lamps associated with each of the said block lamps and with indicia representative of its combining number or numbers; a second block of electric lamps, each lamp being associated with indicia representative of a different negative chemical element or radical, and an additional lamp or lamps associated with each of the said second block lamps and with indicia representative of its combining number or numbers; a gang switch for selecting a predetermined lamp of the first block; a gang switch for selecting a predetermined lamp of the second block; interconnecting circuits for the said switches and lamps, and a source of electricity for energizing a selected block lamp; and means controlled by said gang switches for selecting and energizing a corresponding associated combining number lamp or lamps simultaneously with the selection of the said block lamps.

5. Educational apparatus embodying a block of electric lamps, each lamp being associated with indicia representative of a different positive chemical element or radical, and an additional lamp or lamps associated with each of the said block lamps and with indicia representative of its combining number or numbers; a second block of electric lamps, each lamp being associated with indicia representative of a different negative chemical element or radical, and an additional lamp or lamps associated with each of the said second block lamps and with indicia representative of its combining number or numbers; a gang switch for selecting a predetermined lamp of the first block; a gang switch for selecting a predetermined lamp of the second block; interconnecting circuits for the said switches and lamps, and a source of electricity for energizing a selected block lamp; relays for controlling the energization of the combining number lamps of the first block; and relays for controlling the energization of the combining number lamps of the second block, said relays being operated by the gang switch of the first block and the relays of said first block by the gang switch of the second block.

6. Educational apparatus embodying a block of electric lamps, each lamp being associated with indicia representative of a different positive chemical element or radical, and an additional lamp or lamps associated with each of the said block lamps and with indicia representative of its combining number or numbers; a second block of electric lamps, each lamp being associated with indicia representative of a different negative chemical element or radical, and an additional lamp or lamps associated with each of the said second block lamps and with indicia representative of its combining number or numbers; a gang switch for selecting a predetermined lamp of the first block; a gang switch for selecting a predetermined lamp of the second block; interconnecting circuits for the said switches and lamps and a source of electricity for energizing a selected block lamp; means controlled by said gang switches for selecting and energizing a corresponding associated combining number lamp or lamps simultaneously with the selection of the said block lamps; and means for interrupting automatically the supply of electricity to the selected lamps and associated combining number lamps under certain combinations thereof as selected by said gang switches.

7. Educational apparatus comprising a panel member embodying a block of electric lamps and individual panel elements bearing indicia representative of a different positive chemical element or radical and adapted for illumination by a respective lamp or lamps; a second block of electric lamps and individual panel elements bearing indicia representative of a different negative chemical element or radical and associated with said first-named panel elements and adapted for illumination by a respective lamp of the second block; and a remotely located operating member for controlling the illumination of the suitable indicia of panel elements of the respective blocks and comprising a gang switch for selecting a predetermined lamp of the first block and a gang switch for selecting a predetermined lamp of the second block, together with interconnecting circuits for said switches and lamps, and a source of electricity for energizing the respective selected lamps.

8. Educational apparatus comprising a panel member embodying a block of electric lamps and individual panel elements bearing indicia representative of a different positive chemical element or radical and adapted for illumination by a respective lamp or lamps; a second block of electric lamps and individual panel elements bearing indicia representative of a different negative chemical element or radical and associated with said first-named panel elements and adapted for illumination by a respective lamp of the second block; a remotely located operating member for controlling the illumination of the suitable indicia or panel elements of the respective blocks and comprising a gang switch for selecting a predetermined lamp of the first block and a gang switch for selecting a predetermined lamp of the second block, together with interconnecting circuits for said switches and lamps, and a source of electricity for energizing the respective selected lamps; and means associated with one of the members for interrupting automatically the supply of electricity to the selected lamps under certain combinations thereof as selected by said gang switches.

9. In educational apparatus including a pair of apparatuses as set forth in claim 1: means associated with each of said apparatuses for indicating automatically through the selection of a compound predetermined thereon the number of units of such compound chemically combining with a compound selected by the other of said apparatuses; and circuits interconnecting the two apparatuses and including an additional control switch on the respective gang switches of each of the two said apparatuses and operated jointly therewith.

10. In educational apparatus including a pair of apparatuses as set forth in claim 1: means associated with each of said apparatuses for indicating automatically through the selection of a compound predetermined thereon the number of units of such compound chemically combining with a compound selected by the other of said apparatuses; and circuits interconnecting the two apparatuses and including an additional control switch on the respective gang switches of each of the two said apparatuses and operated jointly therewith, the additional associated control switch of one of the apparatuses controlling the indicating means of the other apparatus and vice versa.

HAROLD S. van DOREN.